United States Patent
Jobson et al.

(10) Patent No.: US 12,512,547 B2
(45) Date of Patent: Dec. 30, 2025

(54) BATTERY UNIT

(71) Applicant: VOLVO TRUCK CORPORATION, Gothenburg (SE)

(72) Inventors: Edward Jobson, Romelanda (SE); Hanna Bryngelsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 999 days.

(21) Appl. No.: 17/596,983

(22) PCT Filed: Jun. 26, 2020

(86) PCT No.: PCT/EP2020/068051
§ 371 (c)(1),
(2) Date: Dec. 22, 2021

(87) PCT Pub. No.: WO2020/260602
PCT Pub. Date: Dec. 30, 2020

(65) Prior Publication Data
US 2022/0263179 A1 Aug. 18, 2022

Related U.S. Application Data

(63) Continuation of application No. PCT/EP2019/067034, filed on Jun. 26, 2019.

(51) Int. Cl.
*H01M 50/249* (2021.01)
*H01M 10/625* (2014.01)
(Continued)

(52) U.S. Cl.
CPC ....... *H01M 50/249* (2021.01); *H01M 10/625* (2015.04); *H01M 50/209* (2021.01);
(Continued)

(58) Field of Classification Search
CPC ............. H01M 50/296; H01M 50/543; H01M 50/547; H01M 50/502; H01M 50/553
See application file for complete search history.

(56) References Cited

U.S. PATENT DOCUMENTS

| | | | | |
|---|---|---|---|---|
| 2012/0064387 A1* | 3/2012 | Kim | .................... | H01M 50/553 |
| | | | | 429/158 |
| 2012/0171552 A1* | 7/2012 | Lachenmeier | .......... | B60L 58/19 |
| | | | | 429/159 |

(Continued)

FOREIGN PATENT DOCUMENTS

| | | | |
|---|---|---|---|
| CN | 102301505 A | 12/2011 |
| CN | 102969544 A | 3/2013 |

(Continued)

OTHER PUBLICATIONS

WO 2010/109882 A1 translation (Year: 2010).*

(Continued)

*Primary Examiner* — Helen Oi K Conley
*Assistant Examiner* — Amanda Rosenbaum
(74) *Attorney, Agent, or Firm* — Jeffri A. Kaminski; Venable LLP

(57) ABSTRACT

The present invention relates to a battery unit (14) comprising six battery unit faces (30, 32, 34, 36, 38, 40). The battery unit (14) has a shape that can be inscribed in an imaginary cube having six cube faces such that each battery unit face (30, 32, 34, 36, 38, 40) forms part of a corresponding imaginary cube face, wherein a first battery unit face pair of the battery unit (14) comprises a first battery unit face (30) and a second battery unit face (32). The first battery unit face (30) comprises a first set of anode terminals (42) and a first set of cathode terminals (44), the second battery unit face (32) comprising a second set of anode terminals (46) and a second set of cathode terminals (48). The battery unit (14) is (Continued)

such that the second battery unit face (32) can assume two different positions relative to a first battery unit face (30) of a second battery unit (16) of the same type, wherein:—in a first position, each anode terminal of the second set of anode terminals (46) of the second battery unit face (32) contacts an anode terminal of the first set of anode terminals (42) of the first battery unit face (30) of the second battery unit (16) and each cathode terminal of the second set of cathode terminals (48) of the second battery unit face (32) contacts a cathode terminal of the first set of cathode terminals (44) of the first battery unit face (30) of the second battery unit (16), and - in a second position, each anode terminal of the second set of anode terminals (46) of the second battery unit face (32) contacts a cathode terminal of the first set of cathode terminals (44) of the first battery unit face (30) of the second battery unit (16) and each cathode terminal of the second set of cathode terminals (48) of the second battery unit face (32) contacts an anode terminal of the first set of anode terminals (42) of the first battery unit face (30) of the second battery unit (16).

9 Claims, 11 Drawing Sheets

(51) Int. Cl.
*H01M 50/209* (2021.01)
*H01M 50/258* (2021.01)
*H01M 50/296* (2021.01)
*H01M 50/509* (2021.01)
*H01M 50/514* (2021.01)
*H01M 50/547* (2021.01)

(52) U.S. Cl.
CPC ....... *H01M 50/258* (2021.01); *H01M 50/296* (2021.01); *H01M 50/509* (2021.01); *H01M 50/514* (2021.01); *H01M 50/547* (2021.01); H01M 2220/20 (2013.01)

(56) References Cited

U.S. PATENT DOCUMENTS

| | | | |
|---|---|---|---|
| 2018/0219194 A1* | 8/2018 | Ladroue | H01M 50/176 |
| 2018/0287161 A1* | 10/2018 | Bisaro | H01M 4/64 |
| 2018/0309094 A1* | 10/2018 | Holl | H01M 50/509 |
| 2019/0019998 A1* | 1/2019 | Schoenherr | H01M 50/271 |

FOREIGN PATENT DOCUMENTS

| | | | | |
|---|---|---|---|---|
| CN | 108461566 A | | 8/2018 | |
| CN | 110062965 A | | 7/2019 | |
| DE | 102011121488 A1 | | 6/2013 | |
| JP | H07142039 A | | 6/1995 | |
| WO | WO-2010109882 A1 | * | 9/2010 | ............ H01M 10/04 |
| WO | 2018208020 A1 | | 11/2018 | |

OTHER PUBLICATIONS

International Search Report and Written Opinion dated Oct. 5, 2020 in corresponding International PCT Application No. PCT/EP2020/068051, 10 pages.

International Preliminary Report on Patentability dated Jun. 14, 2021in corresponding International PCT Application No. PCT/EP2020/068051, 16 pages.

* cited by examiner

BATTERY UNIT

CROSS-REFERENCE TO RELATED APPLICATIONS

This application is a U.S. National Stage application of PCT/EP2020/068051, filed Jun. 26, 2020, and published on Dec. 30, 2020, as WO 2020/260602 A1, which is a continuation of PCT/EP2019/067034, filed Jun. 26, 2019, all of which is hereby incorporated by reference in its entirety.

TECHNICAL FIELD

The present invention relates to a battery unit according to the preamble of claim 1 as well as the preamble of claim 9. Moreover, the present invention relates to a battery unit assembly.

The invention can be applied in heavy-duty vehicles, such as trucks, buses and construction equipment. Although the invention will be described with respect to a truck, the invention is not restricted to this particular vehicle, but may also be used in other vehicles such as buses and construction equipment. Furthermore, the invention can be used in applications not necessarily related to vehicles.

BACKGROUND

A battery unit assembly may comprise a plurality of battery units being arranged in an array such that the plurality of battery units together supplies electrical power. For instance, each battery unit may be cubical in order to ensure that the battery units may be arranged in a compact manner.

An example of such a battery unit is disclosed in US 2017/0110696 A1. Although the US 2017/0110696 A1 battery unit may be useful for certain application, there is still a need for improvement of the battery unit assembly disclosed therein.

SUMMARY

An object of a first aspect of the present invention is to provide a battery unit that implies a versatile configuration of a battery unit assembly.

The object is achieved by a battery unit according to claim 1.

As such, the first aspect of the present invention relates to a battery unit comprising six battery unit faces. The battery unit has a shape that can be inscribed in an imaginary cube having six cube faces such that each battery unit face forms part of a corresponding imaginary cube face, wherein a first battery unit face pair of the battery unit comprises a first battery unit face and a second battery unit face.

According to the first aspect of the present invention, the first battery unit face comprises a first set of anode terminals and a first set of cathode terminals and the second battery unit face comprises a second set of anode terminals and a second set of cathode terminals.

The battery unit is such that the second battery unit face can assume two different positions relative to a first battery unit face of a second battery unit of the same type, wherein:

in a first position, each anode terminal of the second set of anode terminals of the second battery unit face contacts an anode terminal of the first set of anode terminals of the first battery unit face of the second battery unit and each cathode terminal of the second set of cathode terminals of the second battery unit face contacts a cathode terminal of the first set of cathode terminals of the first battery unit face of the second battery unit, and in a second position, each anode terminal of the second set of anode terminals of the second battery unit face contacts a cathode terminal of the first set of cathode terminals of the first battery unit face of the second battery unit and each cathode terminal of the second set of cathode terminals of the second battery unit face contacts an anode terminal of the first set of anode terminals of the first battery unit face of the second battery unit.

By virtue of the battery unit presented above, it is possible to realize a parallel battery cell coupling between two battery units, by arranging the second battery unit face in the first position, but it is also possible to realize a serial battery cell coupling between two battery units, by arranging the second battery unit face in the second position.

As such, the battery unit of the first aspect of the present invention implies a versatile battery unit that can be used for generating any combination of parallel and serial connections of between adjacent battery units in a battery unit assembly.

As used herein, the term "battery unit" relates to a single battery cell or a plurality of battery cells arranged so as to be connected together within the battery unit.

As used herein, the term "anode terminal" relates to an electrode connection point for the anode of the battery unit. A set of anode terminals may be constituted by only one anode terminal but it may also comprise a plurality of anode terminals. In a similar vein, the term "cathode terminal" relates to an electrode connection point for the cathode of the battery unit. A set of cathode terminals may be constituted by only one cathode terminal but it may also comprise a plurality of cathode terminals.

As a non-limiting example, the second battery unit of the same type may be identical to the battery unit of the first aspect of the present invention.

Optionally, the first battery unit face can assume two different positions relative to a second battery unit face of a second battery unit of the same type such that the above two positions and associated contacts are obtained between the first battery unit face of the first battery unit and the second battery unit face of the second battery unit. As such, the term "assume two different positions" between two faces of two battery units can be achieved by moving the first battery unit relative to the second battery unit, moving the second battery unit relative to the first battery unit, or a combination thereof.

Optionally, the first battery unit face comprises a first centre point located in the intersection of the diagonals of the first battery unit face. The first battery unit face further comprises a first centre surface portion enclosing the first centre point. Each anode terminal of the first set of anode terminals and each cathode terminal of the first set of cathode terminals may be located outside the first centre surface portion.

As such, the first centre surface portion of the first battery unit face may be free from anodes and cathodes. This in turn implies that it may be possible to arrive at the different contact configurations in the first and second positions, respectively, in a straightforward manner. For instance, the different contact configurations may be obtained by rotating at least one battery face.

Moreover, the first centre surface portion being free from anodes and cathodes, can be used for cooling fluid openings and/or communication interfaces.

Optionally, the first centre surface portion connects the four edges of the first battery unit face, preferably the area of the first centre surface portion is at least 50%, preferably at least 70%, of the area of the first battery unit face.

Having the first centre surface portion as recited above implies a reduced risk of inadvertent contacts between anode terminals and cathode terminals of adjacent battery units.

Optionally, the first set of anode terminals comprises at least two anode terminals located on opposing sides outside of the first centre surface portion, the first set of cathode terminals further comprising at least two cathode terminals located on two other opposing sides outside of the first centre surface portion.

Optionally, each one of the first battery unit face and the second battery unit face extends along a first direction and a second direction, the first and second direction being perpendicular to each other. A position of an anode terminal, in the first and second directions, of the first set of anode terminals of first battery unit face may be the same as a position of a cathode terminal, in the first and second directions, of the second set of cathode terminals of the second battery unit face of the battery unit.

Optionally, the first battery unit face and the second battery unit face are located on opposite sides of the battery unit. Such a configuration simplifies the generation of an array of battery units.

Optionally, the battery unit comprises a second battery unit face pair comprising the features of the first battery unit face pair, preferably the battery unit further comprises a third battery unit face pair comprising the features of the first battery unit face pair. Such a configuration simplifies the generation of a two-dimensional or a three-dimensional matrix of battery units.

A second aspect of the present invention relates to a battery unit assembly comprising a first battery unit being a battery unit according to the first aspect of the present invention and a second battery unit being a battery unit according to the first aspect of the present invention.

An object of a third aspect of the present invention is to provide a battery unit that implies a versatile configuration of a battery unit assembly whilst ensuring an appropriate cooling of the battery unit.

The object is achieved by a battery unit according to claim 9.

As such, the third aspect of the present invention relates to a battery unit comprising six battery unit faces. The battery unit has a shape that can be inscribed in an imaginary cube having six cube faces such that each battery unit face forms part of a corresponding cube face, wherein a first battery unit face pair of the battery unit comprises a first battery unit face and a second battery unit face. The first battery unit face comprises at least an anode terminal and the second battery unit face comprising at least a cathode terminal.

According to the third aspect of the present invention, the first battery unit face comprises a first cooling fluid opening and the second battery unit face comprises a second cooling fluid opening. The cooling fluid openings are in fluid communication with each other within the battery unit.

As such, by virtue of the battery unit of the third aspect of the present invention, it is possible to arrange a cooling circuit through the battery units without the need for additional cooling equipment. Instead, the cooling circuit may be generated by connecting battery units and ensuring that cooling fluid openings of a battery unit is in contact with cooling fluid openings of one or more other battery units.

Optionally, the cooling fluid openings are in fluid communication with each other within the battery unit via at least one cooling conduit extending through the battery unit.

Optionally, the imaginary cube has an imaginary cube length and a cube centre point being located in the centre of the volume defined by the imaginary cube. A smallest distance from the at least one cooling conduit to the cube centre point may be in the range of 0.2 to 0.5 times the imaginary cube length, preferably in the range of 0.3 to 0.5 times the imaginary cube length, more preferred in the range of 0.4 to 0.5 times the imaginary cube length.

As such, the at least one cooling conduit may be located relatively close to the battery unit faces when extending from the first cooling fluid opening to the second cooling fluid opening. This may in turn imply an appropriate cooling of the battery unit.

Optionally, the first battery unit face comprises a first centre point located in the intersection of the diagonals of the first battery unit face. The first cooling fluid opening covers the first centre point. The second battery unit face comprises a second centre point located in the intersection of the diagonals of the second battery unit face, the second cooling fluid opening covering the second centre point. Arranging the cooling fluid openings such that they cover the centre points implies that fluid communication between cooling fluid openings of two adjacent battery units is ensured even if one of the battery units is rotated relative to the other battery unit.

Optionally, the battery unit comprises twelve battery unit edges wherein each battery unit edge connects two battery unit faces. The first battery unit face may comprise at least four cooling fluid openings being arranged at different edges of the first battery unit face. Moreover, the second battery unit face may comprise at least four cooling fluid openings arranged at different edges of the second battery unit face. This is another implementation for ensuring that communication between cooling fluid openings of two adjacent battery units is enabled even if one of the battery units is rotated relative to the other battery unit.

Optionally, the imaginary cube has an imaginary cube length and a smallest distance from a corner of the imaginary cube to an edge defining the fluid opening is at least 5%, preferably at least 10%, of the imaginary cube length.

Optionally, the first battery unit face and the second battery unit face are located on opposite sides of the battery unit.

Optionally, the battery unit comprises a second battery unit face pair comprising the features of the first battery unit face pair, preferably the battery unit further comprises a third battery unit face pair comprising the features of the first battery unit face pair.

Optionally, the battery unit according to the third aspect of the present invention further comprises the features of a battery unit according to the first aspect of the present invention.

A fourth aspect relates to a battery unit assembly. The battery unit assembly comprises a first battery unit being a battery unit according to the third aspect of the present invention and a second battery unit being a battery unit according to the third aspect of the present invention.

A fifth aspect of the present invention relates to a vehicle comprising a battery unit according to the first or the third aspect of the present invention or a battery unit assembly according to the second aspect or the fourth aspect of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a battery unit according to the present invention. However, the present invention may be implemented in a plurality of different types of vehicles. Purely by way of example, the present invention could be implemented in a truck, a tractor, a car, a bus, a work machine such as a wheel loader or any other type of construction equipment. Furthermore, the present invention is not limited to vehicles. Instead, the battery unit or the battery unit assembly of the present invention can be used in various applications.

Figure 1:
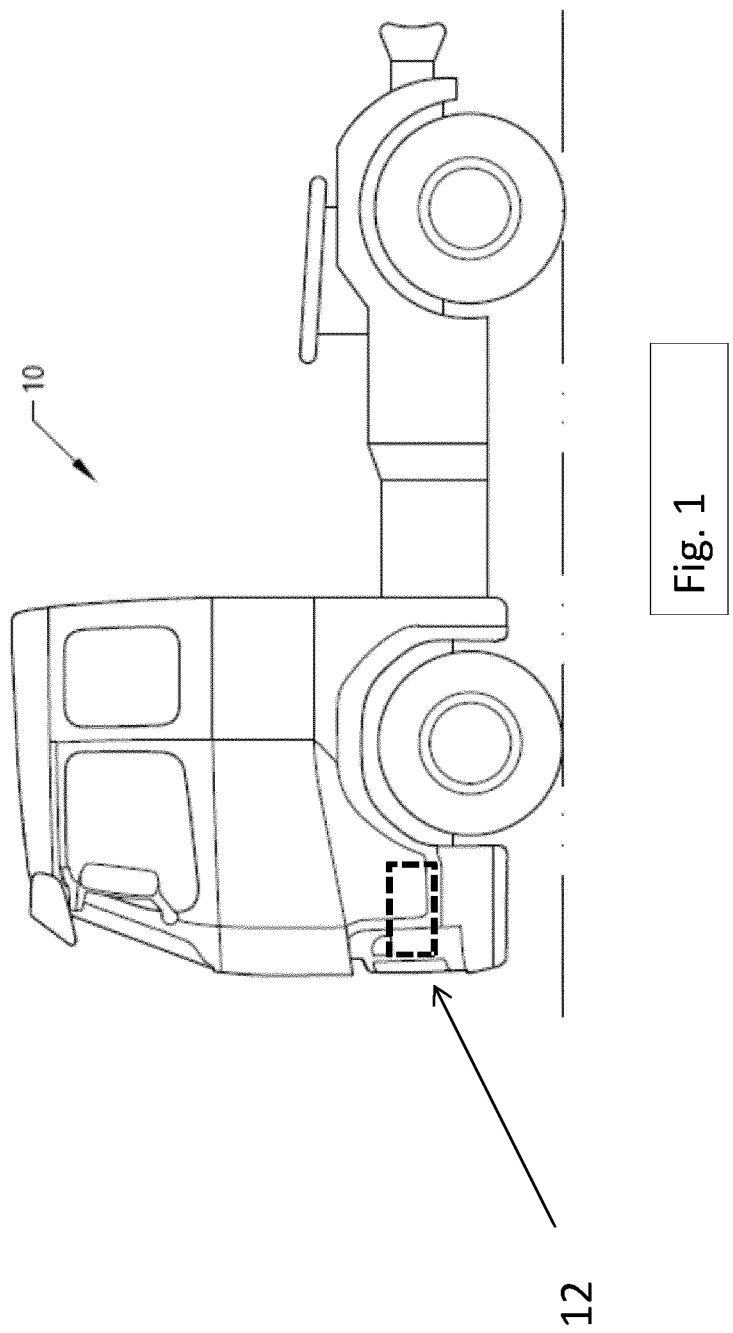
FIG. 1 is a schematic side view of a vehicle.

The FIG. 1 vehicle 10 comprises a battery unit assembly 12. Purely by way of example, the battery assembly 12 may be adapted to supply electric energy for propelling the vehicle 10.

Figure 2:
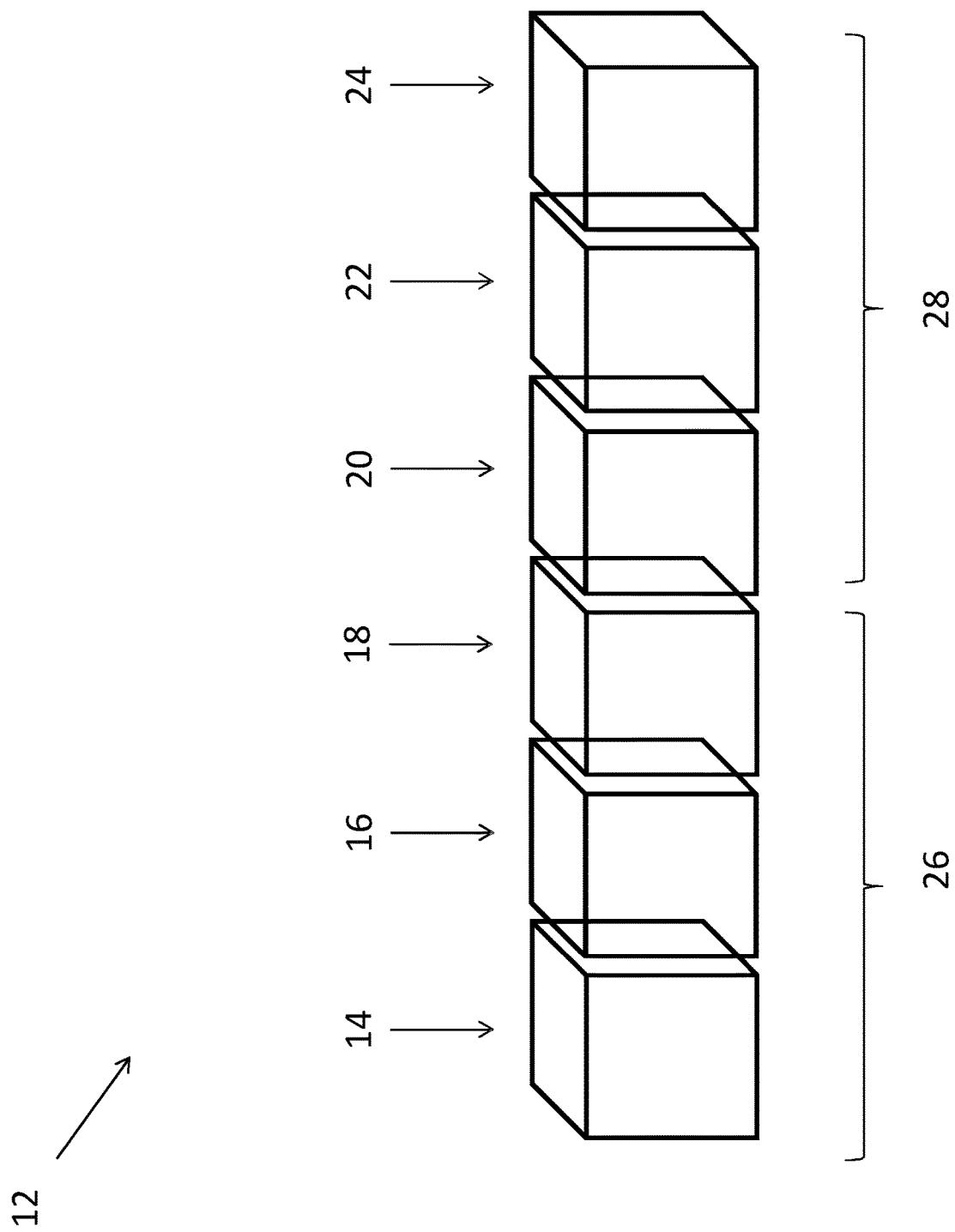
FIG. 2 is a schematic illustration of a battery unit assembly.

FIG. 2 illustrates an embodiment of a battery unit assembly 12. The FIG. 2 battery unit assembly 12 comprises a set of six battery units 14, 16, 18, 20, 22, 24 being arranged in a row. Moreover, a first group 26 of battery units 14, 16, 18 are connected in parallel and a second group 28 of battery units 20, 22, 24 are also connected in parallel. Furthermore, the two groups 26, 28 are connected in series. Put differently, the first group 26 is connected in series to the second group 28.

The above configuration should only be seen as an example. It is of course conceivable that the six battery units 14, 16, 18, 20, 22, 24 may be grouped differently and that each group may comprise battery units that are connected in series or in parallel. Purely by way of example, another example would be that the battery units 14, 16, 18 of the first group 26 are connected in series and that the battery units 20, 22, 24 of the second group 28 are also connected in series. Again as a non-limiting example, the two groups 26, 28 may be connected in parallel.

The previously discussed versatility of the configuration of the battery units 14, 16, 18, 20, 22, 24 is enabled by the configuration of each battery unit. As such, the features of a battery unit according to the present invention will be discussed hereinbelow.

Figure 3:
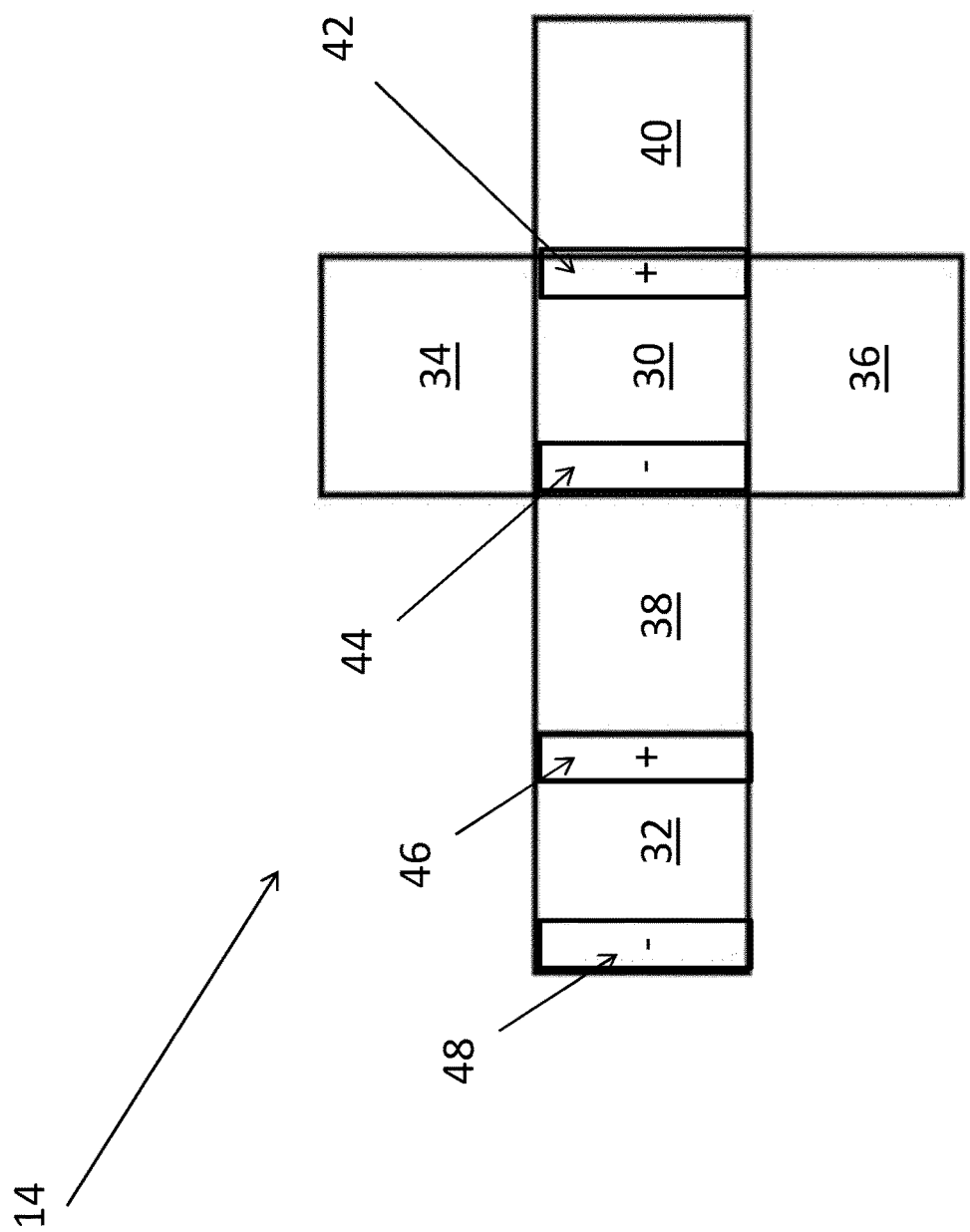
FIG. 3 is a schematic illustration of a battery unit according to an embodiment of the invention.

FIG. 3 illustrates an embodiment of the battery unit 14 of the present invention in a folded out condition. The battery unit 14 comprises six battery unit faces 30, 32, 34, 36, 38, 40.

The battery unit has a shape that can be inscribed in an imaginary cube having six cube faces such that each battery unit face 30, 32, 34, 36, 38, 40 forms part of a corresponding imaginary cube face. Put differently, the battery unit has the shape of a cube or a modified cube. For instance, the battery unit may have a generally cubical shape but may have rounded corners or other modifications, such as recesses, resulting in that the shape of the battery unit departs somewhat from an ideal cubical shape.

Moreover, as indicated in FIG. 3, a first battery unit face pair of the battery unit comprises a first battery unit face 30 and a second battery unit face 32. In the FIG. 3 embodiment, the first battery unit face 30 and the second battery unit face 32 are located on opposite sides of the battery unit 14. However, it is also envisaged that in embodiments of the invention, the first and second unit faces 30, 32 may be adjacent (not shown in FIG. 3).

Furthermore, as illustrated in FIG. 3, the first battery unit face 30 comprises a first set of anode terminals 42 and a first set of cathode terminals 44. In the FIG. 3 embodiment, the first set of anode terminals 42 contains only one anode terminal. In a similar vein, the first set of cathode terminals 44 in the FIG. 3 terminal contains only one cathode terminal. However, it is also envisaged that the first set of anode terminals 42 may comprise a plurality of anodes and/or that first set of cathode terminals 44 may comprise a plurality of cathode terminals, as will be discussed hereinbelow with reference to e.g. FIG. 5.

Moreover, in FIG. 3 the second battery unit face 32 comprises a second set of anode terminals 46 and a second set of cathode terminals 48. As for the first battery unit face 30, in the FIG. 3 embodiment, the second set of anode terminals 46 contains only one anode terminal. In a similar vein, the second set of cathode terminals 48 in the FIG. 3 terminal contains only one cathode terminal. However, it is also envisaged that the second set of anode terminals 46 may comprise a plurality of anodes and/or that second set of cathode terminals 48 may comprise a plurality of cathode terminals, as will be discussed hereinbelow with reference to e.g. FIG. 5.

Irrespective of the number and configuration of the set of anode terminals 42, 46 and the set of cathode terminals 44, 48, the battery unit 14 is such that the second battery unit face 32 can assume two different positions relative to a first battery unit face 30 of a second battery unit 16 of the same type. These two positions are presented hereinbelow with reference to FIG. 4A and FIG. 4B. Each one of FIG. 4A and FIG. 4B may be regarded as disclosing a battery unit assembly comprising a first battery unit 14 being a battery unit according to the invention and a second battery unit 16 being a battery unit according to the invention. Purely by way of example, the first and second battery units 14, 16 are identical.

Figure 4:
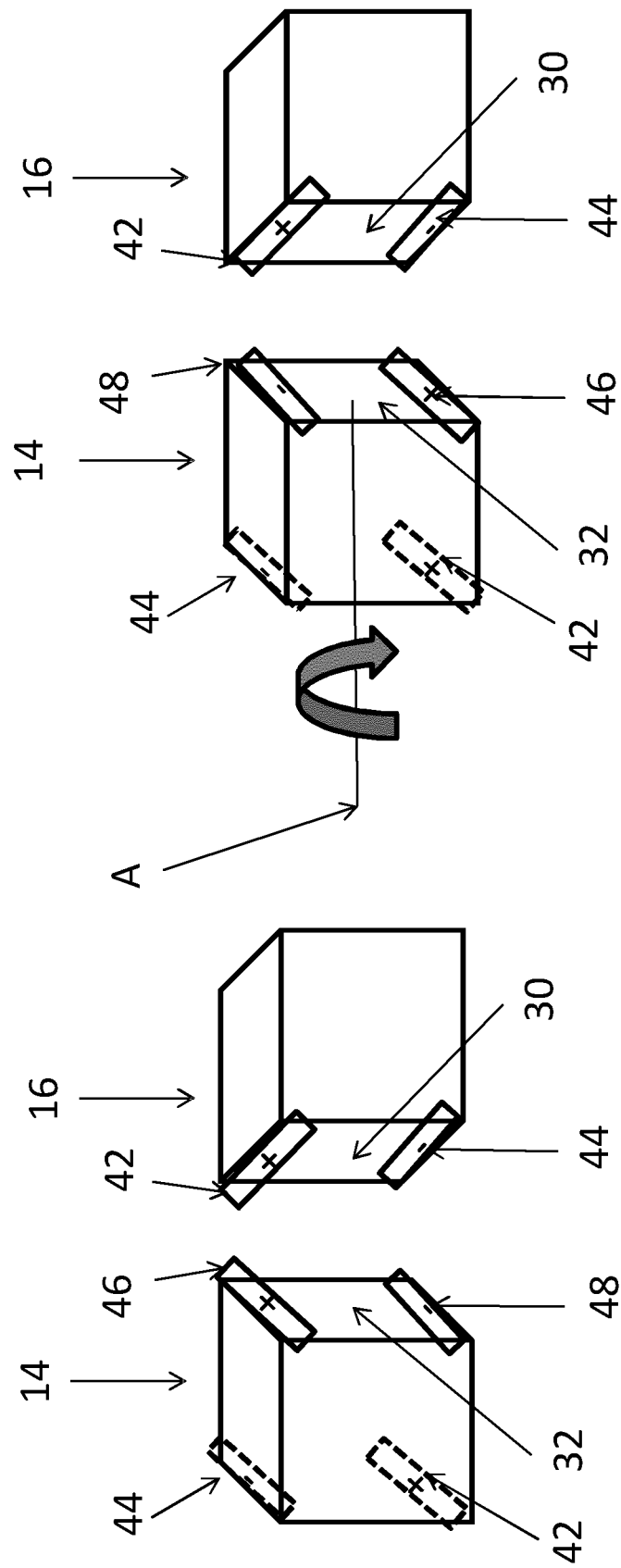
FIGS. 4A and 4B illustrates the FIG. 3 battery unit in two different positions relative to a second battery unit of the same type.

In a first position, illustrated in FIG. 4A, each anode terminal of the second set of anode terminals 46 of the second battery unit face 32 of the battery unit 14 contacts an anode terminal of the first set of anode terminals 42 of the first battery unit face 30 of the second battery unit 16 and each cathode terminal of the second set of cathode terminals 48 of the second battery unit face 32 of the battery unit 14 contacts a cathode terminal of the first set of cathode terminals 44 of the first battery unit face 30 of the second battery unit 16. As such, in the FIG. 4A position, a parallel battery cell coupling between two battery units 14, 16 is obtained.

In a second position, illustrated in FIG. 4B, each anode terminal of the second set of anode terminals 46 of the second battery unit face 32 of the battery unit 14 contacts a cathode terminal of the first set of cathode terminals 44 of the first battery unit face 30 of the second battery unit 16 and each cathode terminal of the second set of cathode terminals 48 of the second battery unit face 32 contacts an anode terminal of the first set of anode terminals 42 of the first battery unit face 30 of the second battery unit 16. As such, in the FIG. 4B position, a serial battery cell coupling between two battery units 14, 16 is obtained.

As indicated in FIG. 4B, a change from the first position to the second position may be achieved by rotating the battery unit 14 around a rotation axis A being parallel to the four edges of the battery unit 14 which do not delimit the second battery unit face 32 and which axis A extends through a first centre point located in the intersection of the diagonals of the second battery unit face 32. In FIG. 4A and FIG. 4B, the rotation is 180° around the rotation axis A. However, it is also envisaged that the change from the first position to the second position may be achieved in other ways, e.g. by a rotation of the battery unit face 32 being different from 180° or by a movement of the second battery unit face 32 relative to other portions of the battery unit 14. For instance, the embodiment of the battery unit 14 discussed hereinbelow with reference to FIG. 5 only needs to be rotated 90° in order to achieve the change from the first positon to the second position.

Figure 5:
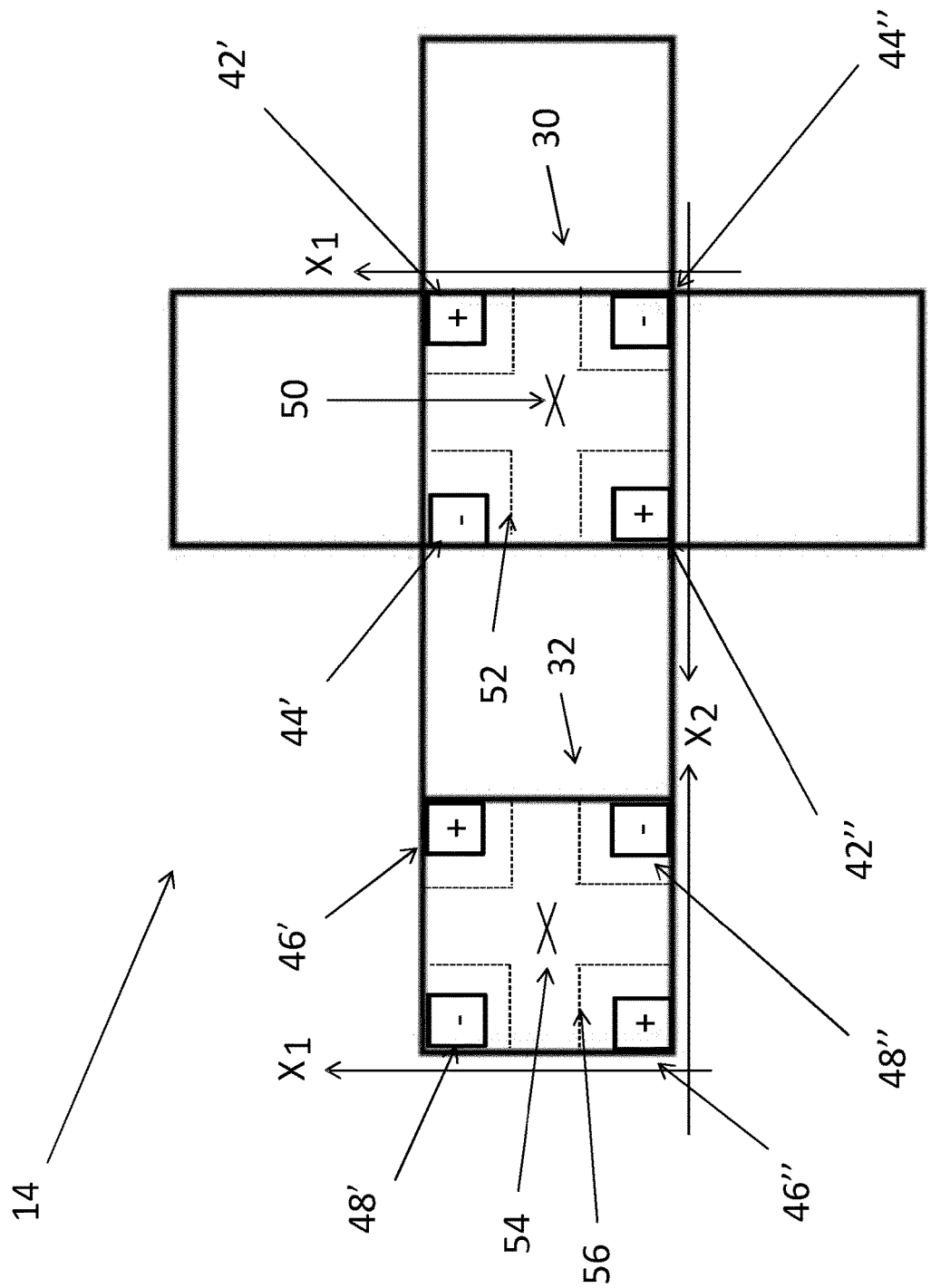
FIG. 5 is a schematic illustration of another battery unit according to an embodiment of the invention.

As such, FIG. 5 illustrates another embodiment of the battery unit 14. In the FIG. 5 embodiment, as in the FIG. 3 embodiment, the first battery unit face 30 comprises a first centre point 50 located in the intersection of the diagonals of the first battery unit face 30. The first battery unit face further comprises a first centre surface portion 52, indicated by dotted lines in FIG. 5, enclosing the first centre point 50. Each anode terminal 42', 42" of the first set of anode terminals 42 and each cathode terminal 44', 44" of the first set of cathode terminals 44 is located outside the first centre surface portion 52.

Purely by way of example, and as illustrated in FIG. 5, the first centre surface portion 52 connects the four edges of the first battery unit face 30. Furthermore, as also illustrated in FIG. 5, the area of the first centre surface portion may be at least 50%, preferably at least 70%, of the area of the first battery unit face 30.

Moreover, as also indicated in FIG. 5, the first set of anode terminals 42 comprises at least two anode terminals 42', 42" located on opposing sides, e.g. diagonally opposing sides, outside of the first centre surface portion 52. Put differently, the first set of anode terminals 42 comprises at least two anode terminals 42', 42" located on opposing sides, e.g. diagonally opposing sides, of the first centre surface portion 52 and the at least two anode terminals 42', 42" are located outside the first centre surface portion 52. Moreover, the first set of cathode terminals 44 comprises at least two cathode terminals 44', 44" located on two other opposing sides, e.g. two other diagonally opposing sides, outside of the first centre surface portion 52.

In a similar vein, in the FIG. 5 embodiment, the second battery unit face 32 comprises a second centre point 54 located in the intersection of the diagonals of the second battery unit face 32. The second battery unit face 32 further comprises a second centre surface portion 56, indicated by dotted lines in FIG. 5, enclosing the second centre point 54. Each anode terminal 46', 46" of the second set of anode terminals 46 and each cathode terminal 48', 48" of the second set of cathode terminals 48 is located outside the second centre surface portion 56.

Purely by way of example, and as illustrated in FIG. 5, the second centre surface portion 56 connects the four edges of the second battery unit face 32. Furthermore, as also illustrated in FIG. 5, the area of the second centre surface portion may be at least 50%, preferably at least 70%, of the area of the second battery unit face.

Moreover, as also indicated in FIG. 5, the second set of anode terminals 46 comprises at least two anode terminals 46', 46" located on opposing sides, e.g. diagonally opposing sides, of and outside the second centre surface portion 56. Moreover, the second set of cathode terminals 48 comprises at least two cathode terminals 48', 48" located on two other opposing sides, e.g. two other diagonally opposing sides, of and outside the second centre surface portion 56.

Further, as indicated in FIG. 5, each one of the first battery unit face 30 and the second battery unit face 32 may extend along a first direction $X_1$ and a second direction $X_2$. The first and second direction $X_1$, $X_2$ are perpendicular to each other. A position of an anode terminal 42", in the first and second directions $X_1$, $X_2$, of the first set of anode terminals 42 of first battery unit face 30 is the same as a position of a cathode terminal 48", in the first and second directions $X_1$, $X_2$, of the second set of cathode terminals 48 of the second battery unit face 32 for the battery unit 14. In FIG. 5, the first and second directions $X_1$, $X_2$ are indicated in the folded out condition of the battery unit 14. However, it is to be understood that the first and second directions $X_1$, $X_2$ are related to the battery unit 14 when the battery unit 14 assumes the shape of a cube or a modified cube as discussed above.

Figure 6:
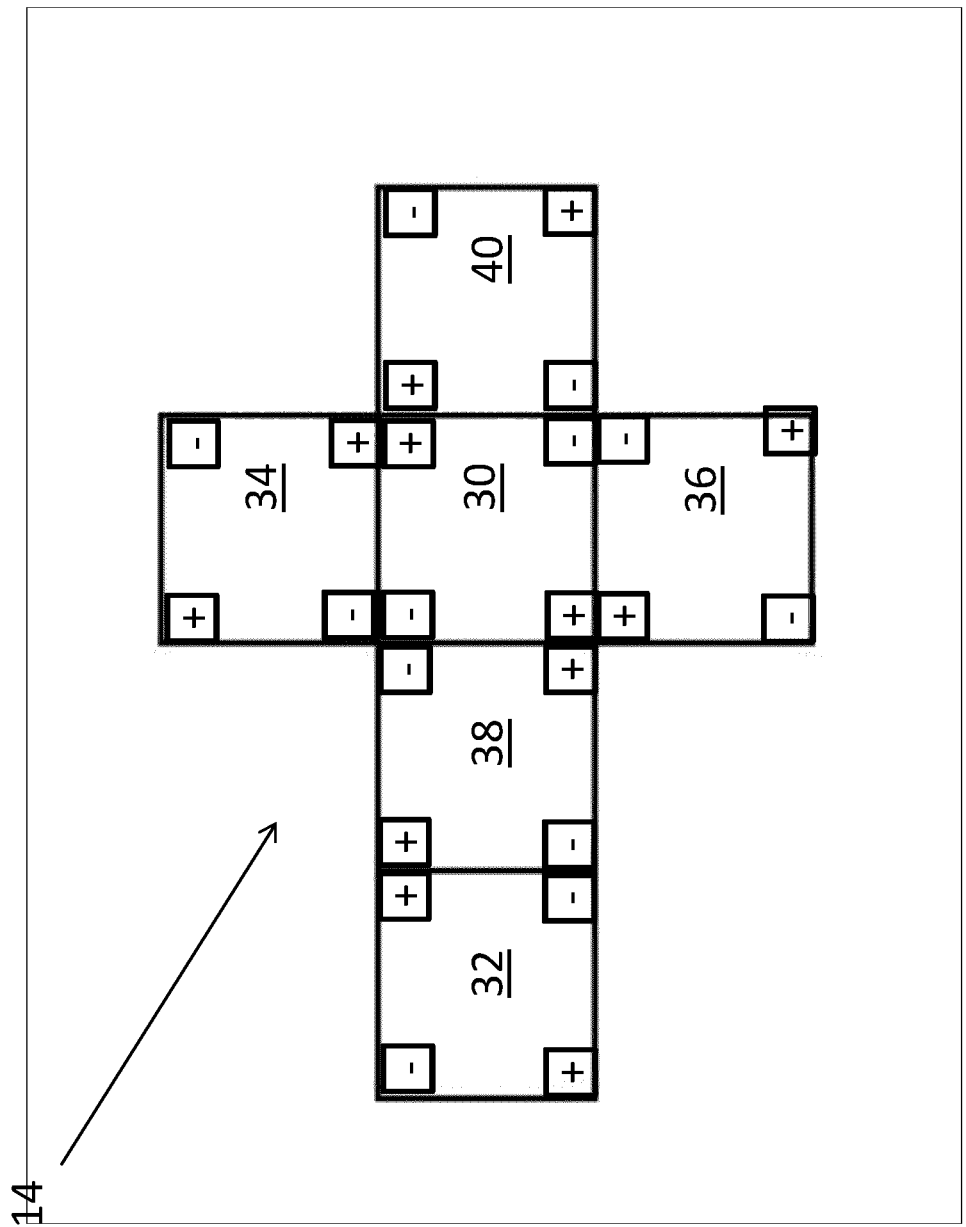
FIG. 6 is a schematic illustration of a battery unit according to yet another embodiment of the invention.

FIG. 6 illustrates a further embodiment of a battery unit 14. As may be gleaned from FIG. 6, the battery unit 14 embodiment disclosed therein comprises, in addition to the first battery unit face pair 30, 32, a second battery unit face pair 34, 36 comprising the features of the first battery unit face pair 30, 32. In the FIG. 6 embodiment, a second battery unit face pair 34, 36 comprises the features of the first battery unit face pair 30, 32 discussed hereinabove in relation to FIG. 5. However, it is also envisaged that the second battery unit face pair 34, 36 may comprise the features of the first battery unit face pair 30, 32 of another embodiment of the battery unit 14, such as the embodiment discussed hereinabove with relation to FIG. 3.

In a similar vein, the FIG. 6 battery unit 14 further comprises a third battery unit face pair 38, 40 comprising the features of the first battery unit face pair. In the FIG. 6 embodiment, the third battery unit face pair 38, 40 comprises the features of the first battery unit face pair 30, 32 discussed hereinabove in relation to FIG. 5. However, it is also envisaged that the third battery unit face pair 38, 40 may comprise the features of the first battery unit face pair 30, 32 of another embodiment of the battery unit 14, such as the embodiment discussed hereinabove with relation to FIG. 3. Here, it is envisaged that embodiments of the battery unit 14 may comprise two or three battery unit face pairs wherein the pairs are identical, e.g. have the same set of features as regards e.g. the number and relative positions of the anode and cathode terminals.

Figure 7:
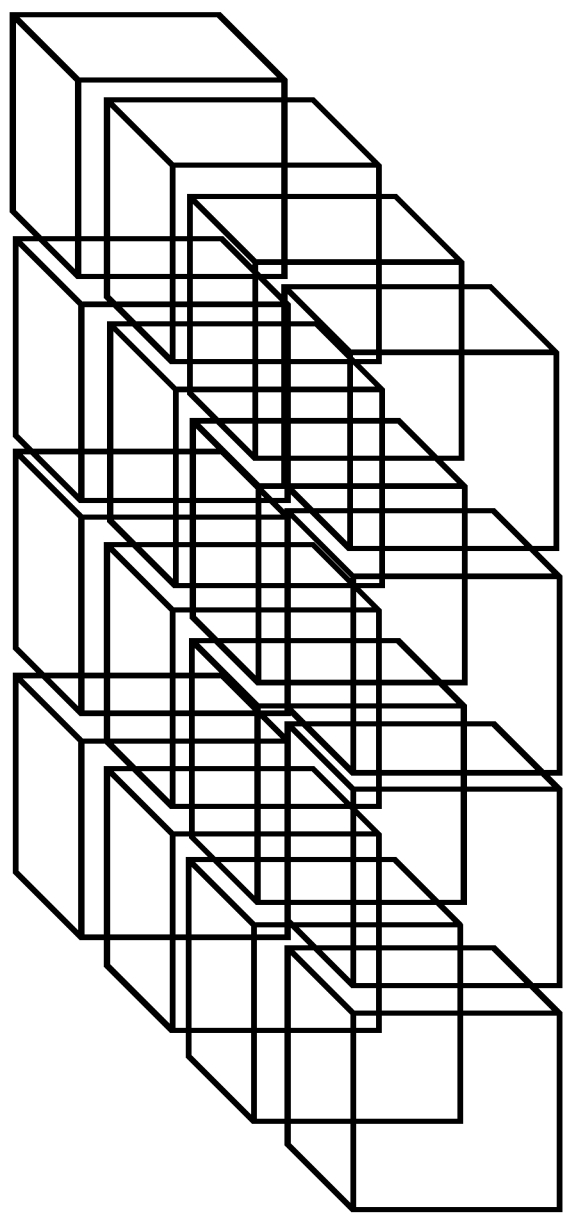
FIG. 7 is a schematic illustration of a battery unit assembly.

Purely by way of example, a battery unit 14 comprising two or three battery unit face pairs may be used for generating a two-dimensional or a three-dimensional battery unit assembly in which each adjacent battery unit pair can be connected in series or in parallel, owing to the above discussed features of each battery unit 14. To this end FIG. 7 illustrates an embodiment of a battery unit assembly in which a plurality of battery units forms a two-dimensional matrix of battery units.

Figure 8:
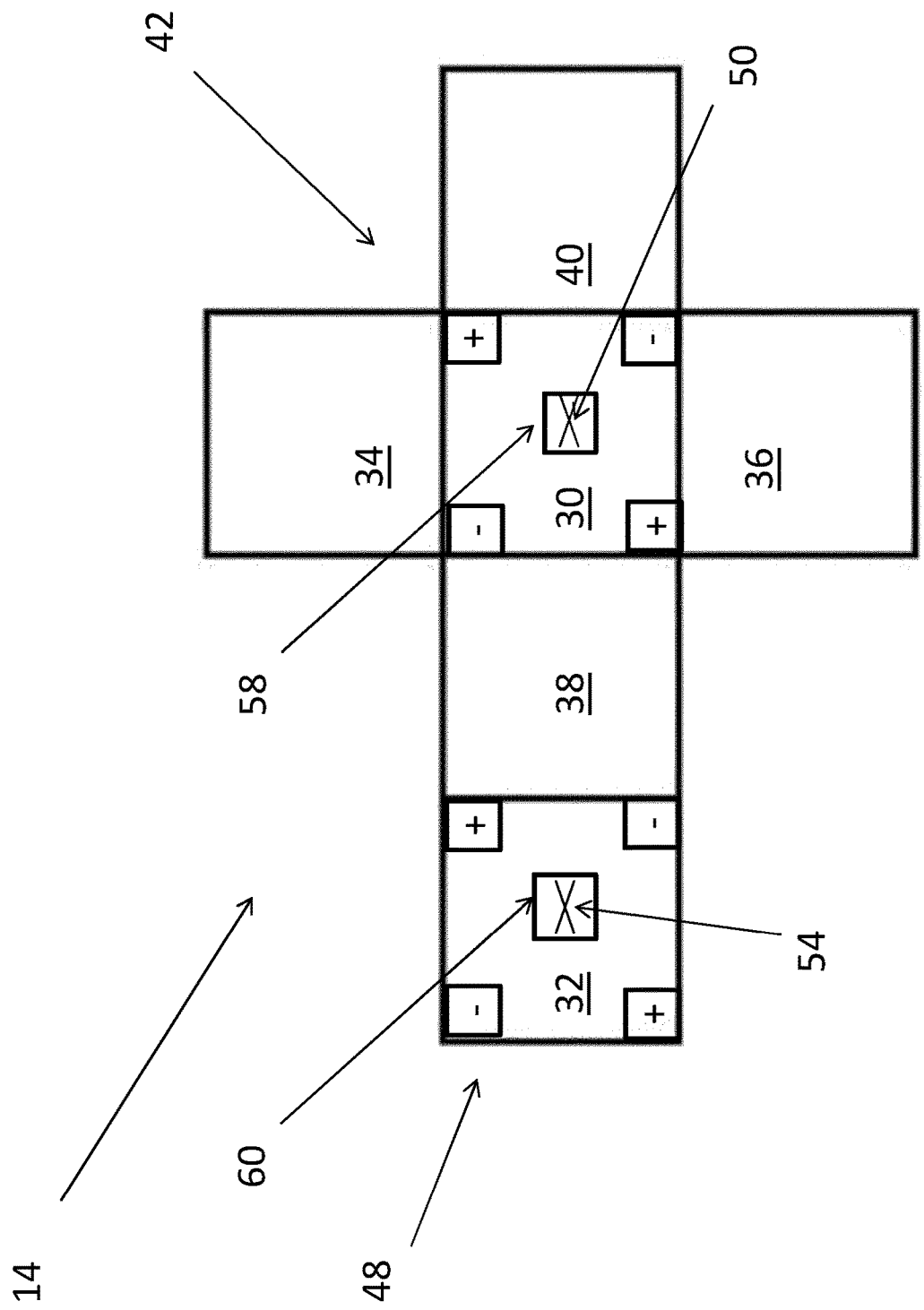
FIG. 8 is a schematic illustration of a battery unit according to still another embodiment of the invention.

FIG. 8 illustrates another embodiment of the invention which also relates to a battery unit 14 comprising six battery unit faces. The battery unit 14 has a shape that can be inscribed in an imaginary cube having six cube faces 30, 32, 34, 36, 38, 40 such that each battery unit face 30, 32, 34, 36, 38, 40 forms part of a corresponding cube face. A first battery unit face pair of the battery unit comprises a first battery unit face 30 and a second battery unit face 32. In the FIG. 8 embodiment, the first battery unit face 30 and the second battery unit face 32 are located on opposite sides of the battery unit 14. However, it is also envisaged that the first and second battery unit faces 30, 32 may be adjacent in other embodiments of the invention.

Moreover, as indicated in FIG. 8, the first battery unit face comprises at least an anode terminal 42 and the second battery unit face comprising at least a cathode terminal 48. In the FIG. 8 embodiment, the first battery unit face 30 comprises a first set of anode terminals 42 and a first set of cathode terminals 44 and the second battery unit face 32 comprises a second set of anode terminals 46 and a second set of cathode terminals 48, in the manner that has been discussed hereinabove in relation to FIG. 5.

Furthermore, the first battery unit face 30 comprises a first cooling fluid opening 58 and the second battery unit face comprises a second cooling fluid opening 60. The cooling fluid openings 58, 60 are in fluid communication with each other within the battery unit 14.

As indicated in FIG. 8, the first battery unit face 30 comprises a first centre point 50 located in the intersection of the diagonals of the first battery unit face 30. The first cooling fluid opening 58 covers the first centre point 50. The second battery unit face 32 comprises a second centre point 54 located in the intersection of the diagonals of the second battery unit face 32. The second cooling fluid opening 60 covers the second centre point 54.

Figure 9:
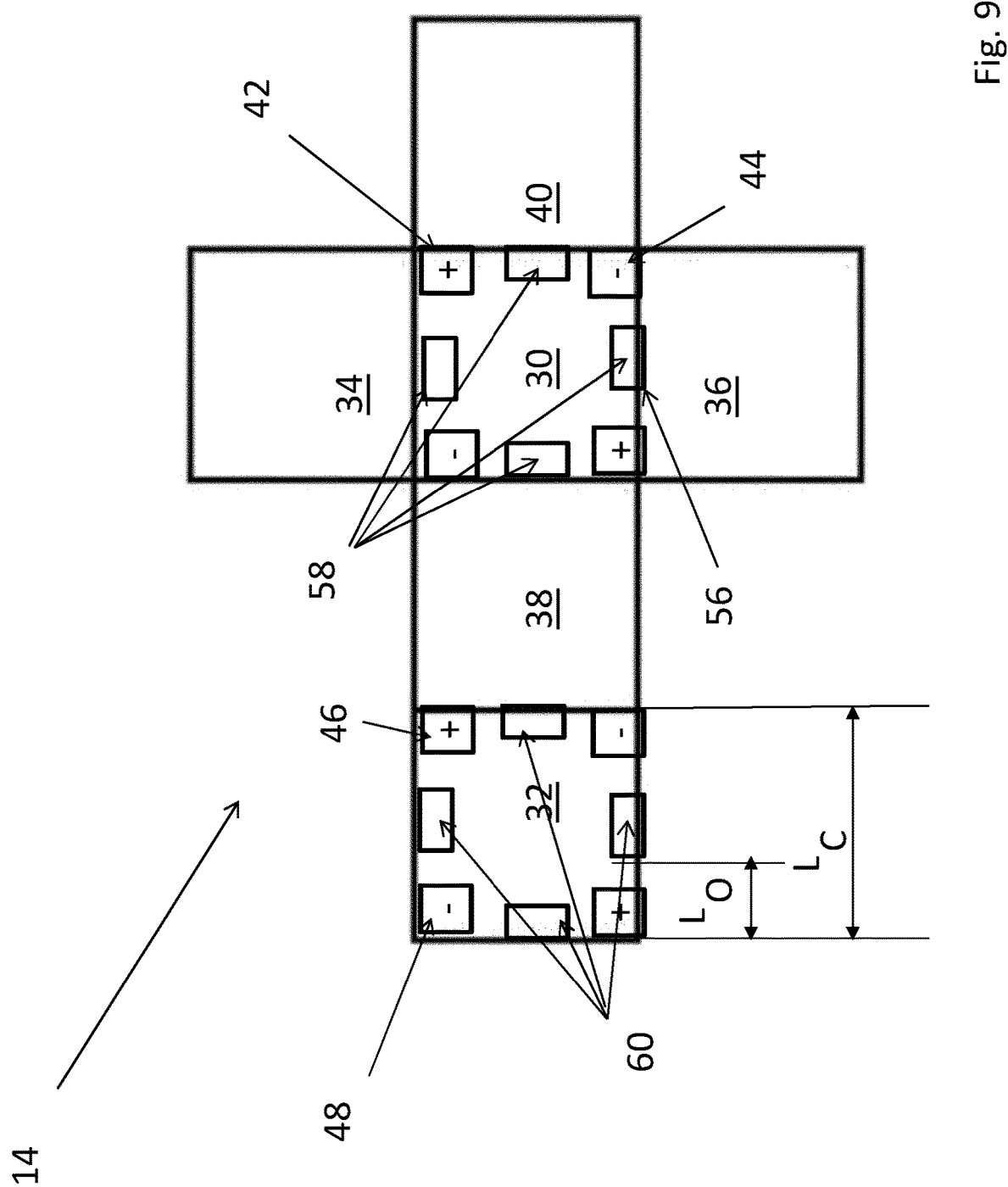
FIG. 9 is a schematic illustration of a battery unit according to a further embodiment of the invention.

FIG. 9 illustrates another embodiment of the battery unit 14 in which the battery unit 14 comprises twelve battery unit edges wherein each battery unit edge connects two battery unit faces. The first battery unit face 30 comprises at least four cooling fluid openings 58 being arranged at different edges of the first battery unit face 30. As such, each one of the four cooling fluid openings 58 extends to an edge of the first battery unit face 30. Moreover, the second battery unit face 32 comprises at least four cooling fluid openings 60 arranged at different edges of the second battery unit face 32. As such, each one of the four cooling fluid openings 60 extends to an edge of the second battery unit face 32. Furthermore, in the FIG. 9 embodiment, the imaginary cube has an imaginary cube length $L_C$ and a smallest distance $L_O$ from a corner of the imaginary cube to an edge defining the fluid opening is at least 5%, preferably at least 10%, of the imaginary cube length $L_C$.

Figure 10:
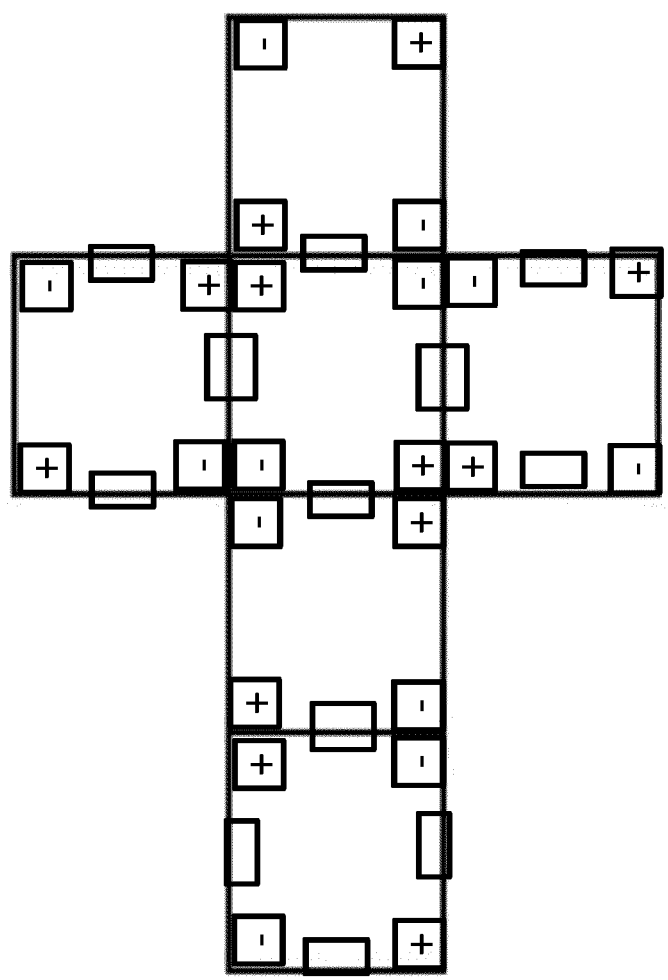
FIG. 10 is a schematic illustration of a battery unit according to another embodiment of the invention.

Moreover, it should be noted that in embodiments of the invention, the battery unit 14 may comprise a second battery unit face pair comprising the features of the first battery unit face pair. Furthermore, the battery unit may comprise a third battery unit face pair comprising the features of the first battery unit face pair. To this end, reference is made to FIG. 10 illustrating a battery unit 14 with three battery unit face pairs, each battery unit face pair having the features of the battery unit face pair discussed above with reference to FIG. 9.

Figure 11:
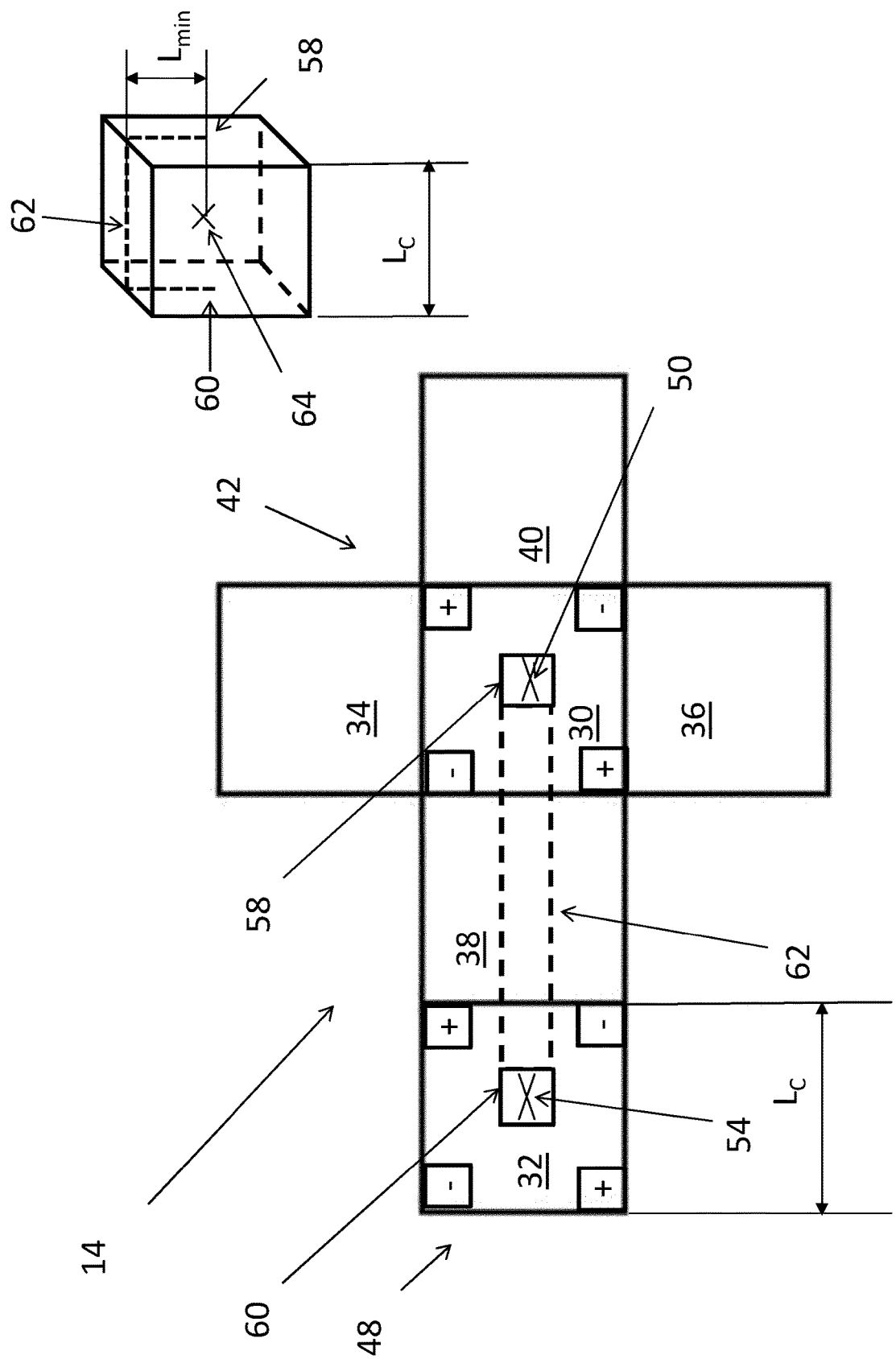
FIG. 11 is a schematic illustration of a battery unit according to yet another embodiment of the invention.

FIG. 11 illustrates yet another embodiment of the battery unit 14. The FIG. 11 embodiment is similar to the FIG. 8 embodiment discussed above. However, as compared to FIG. 8, FIG. 11 illustrates that the cooling fluid openings 58, 60 may be in fluid communication with each other within the battery unit 14 via at least one cooling conduit 62 extending through the battery unit 14.

Although the FIG. 11 embodiment only comprises one cooling conduit 62, it is of course envisaged that embodiments of the battery unit 14 may comprise two or more cooling conduits (not shown in FIG. 11). For instance, embodiments of the battery unit 14 may comprise two or more cooling conduits, each one of which fluidly connecting the same cooling fluid openings 58, 60 as discussed hereinabove with reference to FIG. 8 for instance.

As another non-limiting example, embodiments of the battery unit 14 may comprise two or more cooling conduits connecting each pair of first and second cooling fluid openings 58, 60, see e.g. the FIG. 9 embodiment presented hereinabove.

Moreover, FIG. 11 illustrates an embodiment of the battery unit 14 in which the above-mentioned imaginary cube has an imaginary cube length $L_C$ and a cube centre point 64 that is located in the centre of the volume defined by the imaginary cube.

Purely by way of example, the cube centre point 64 may be determined by identifying the intersection between the diagonals between the corners of the imaginary cube.

Moreover, a smallest distance $L_{min}$, from the at least one cooling conduit 62 to the cube centre point 64 may be in the range of 0.2 to 0.5 times the imaginary cube length $L_C$, preferably in the range of 0.3 to 0.5 times the imaginary cube length $L_C$, more preferred in the range of 0.4 to 0.5 times the imaginary cube length $L_C$.

As such, and as indicated in the FIG. 11 embodiment, the at least one cooling conduit 62 may be located relatively close to the battery unit faces 30, 32, 38 when extending from the first cooling fluid opening 58 to the second cooling fluid opening 60. This is indicated in the upper right portion of FIG. 11.

However, it is also envisaged that the at least one cooling conduit 64 may extend close to, or even through, the cube centre point 64 in other embodiments of the battery unit 14.

Purely by way of example, the conduit 62, or each conduit in embodiments comprising several conduits, may be regarded as a pipe extending between cooling fluid openings 58, 60. Moreover, as a non-limiting example, the cross-section of a conduit 62 may for instance be circular, oval or rectangular. Preferably, a conduit 62, or each conduit in embodiments comprising several conduits, may be located completely within the above-mentioned imaginary cube.

Moreover, embodiments of the present invention with cooling fluid openings may comprise any one of the features discussed hereinabove relating to the set of anode and cathode terminals.

It is to be understood that the present invention is not limited to the embodiments described above and illustrated in the drawings; rather, the skilled person will recognize that many changes and modifications may be made within the scope of the appended claims.

The invention claimed is:

1. A battery unit comprising six battery unit faces, said battery unit having six cube faces, wherein a first battery unit face pair of said battery unit comprises a first battery unit face and a second battery unit face, characterized in that said first battery unit face comprises a first set of anode terminals and a first set of cathode terminals, said second battery unit face comprising a second set of anode terminals and a second set of cathode terminals, said battery unit being such that said second battery unit face can assume two different positions relative to a first battery unit face of a second battery unit of the same type, wherein:

in a first position, each anode terminal of said second set of anode terminals of said second battery unit face contacts an anode terminal of said first set of anode terminals of said first battery unit face of said second battery unit and each cathode terminal of said second set of cathode terminals of said second battery unit face contacts a cathode terminal of said first set of cathode terminals of said first battery unit face of said second battery unit, in a second position, each anode terminal of said second set of anode terminals of said second battery unit face contacts a cathode terminal of said first set of cathode terminals of said first battery unit face of said second battery unit and each cathode terminal of said second set of cathode terminals of said second battery unit face contacts an anode terminal of said first set of anode terminals of said first battery unit face of said second battery unit, said first battery unit face comprises a first centre point located in the intersection of the diagonals of said first battery unit face, said first battery unit face further comprising a first centre surface portion enclosing said first centre point, each anode terminal of said first set of anode terminals and each cathode terminal of said first set of cathode terminals being located outside said first centre surface portion, and said first set of anode terminals comprises at least two anode terminals located on diagonally opposing sides outside of said first centre surface portion, said first set of cathode terminals further comprising at least two cathode terminals located on two other diagonally opposing sides outside of said first centre surface portion, wherein said first centre surface portion connects the four edges of said first battery unit face.

2. The battery unit according to claim 1, wherein each one of said first battery unit face and said second battery unit face extends along a first direction and a second direction, said first and second directions being perpendicular to each other, a position of an anode terminal, in said first and second directions, of said first set of anode terminals of first battery unit face being the same as a position of a cathode terminal, in said first and second directions, of said second set of cathode terminals of said second battery unit face for said battery unit.

3. The battery unit according to claim 1, wherein said first battery unit face and said second battery unit face are located on opposite sides of said battery unit.

4. The battery unit according to claim 1, wherein said battery unit comprises a second battery unit face pair comprising the features of said first battery unit face pair.

5. A battery unit assembly, said battery unit assembly comprising a first battery unit being a battery unit according to claim 1.

6. A vehicle comprising a battery unit according to claim 1.

7. The battery unit according to claim 1, wherein said first centre surface portion is at least 50% of the area of said first battery unit face.

8. The battery unit according to claim 1, wherein said first centre surface portion is at least 70% of the area of said first battery unit face.

9. The battery unit according to claim 4, wherein said battery unit comprises a third battery unit face pair comprising the features of said first battery unit face pair.

* * * * *